Nov. 27, 1951    R. H. MUELLER ET AL    2,576,631
FIRE HYDRANT VALVE OPERATOR
Filed Dec. 27, 1946    6 Sheets-Sheet 1
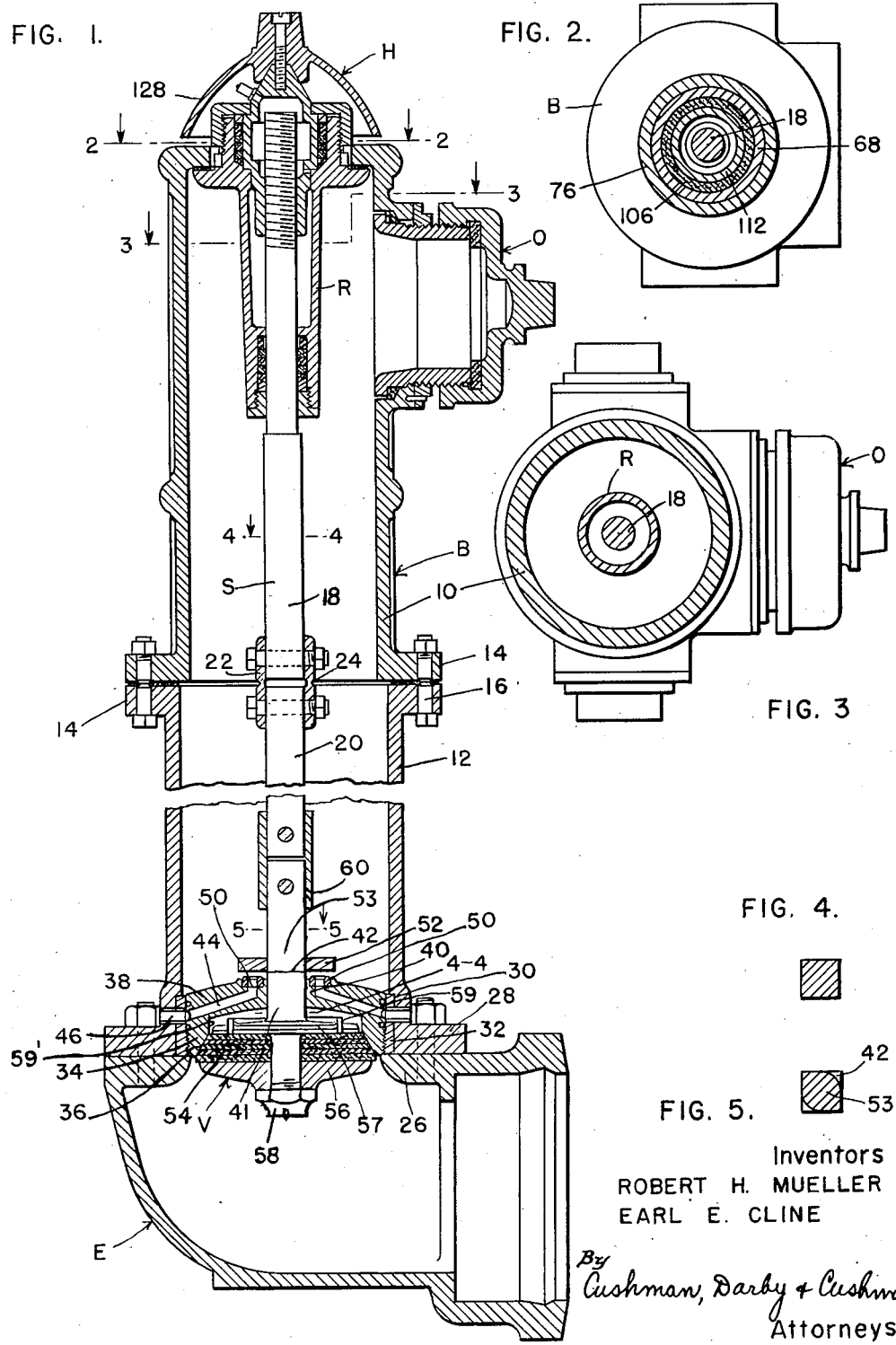
Inventors
ROBERT H. MUELLER
EARL E. CLINE
By
Cushman, Darby & Cushman
Attorneys

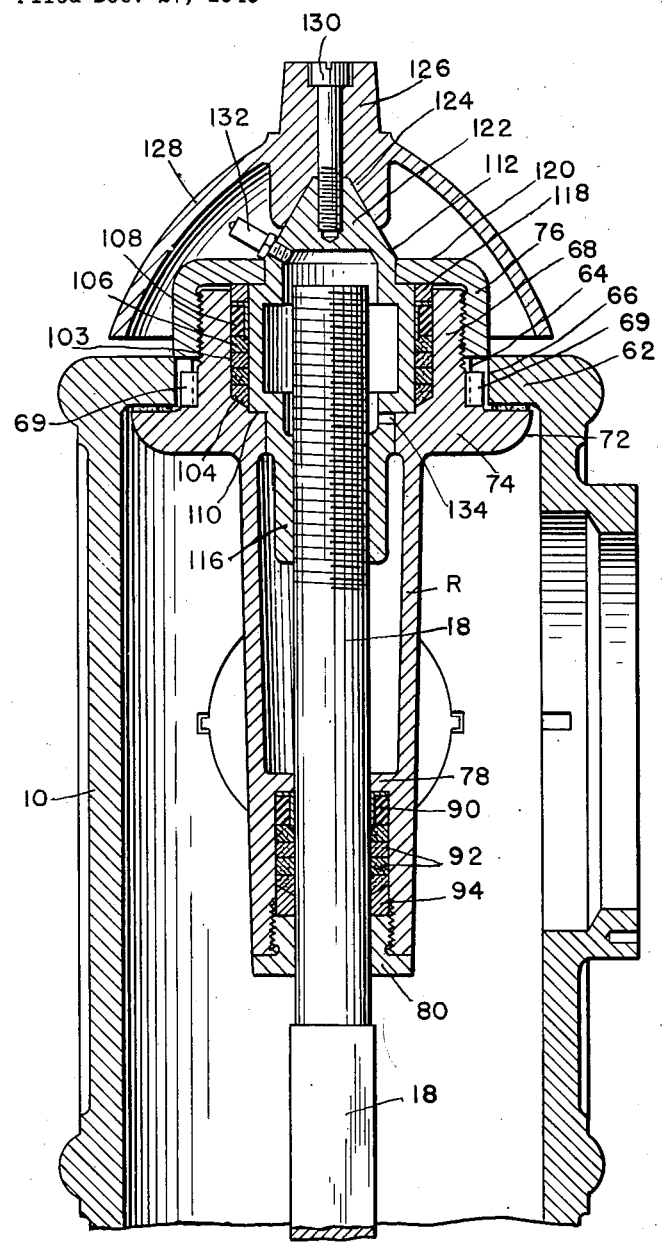
FIG. 6.
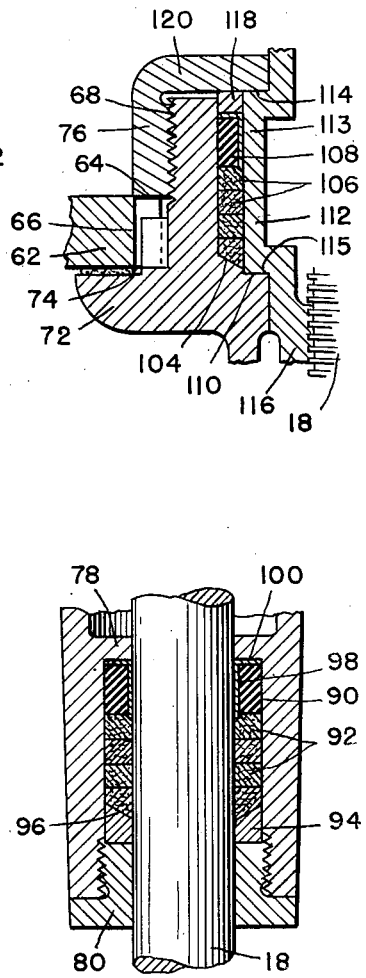
FIG. 8.
FIG. 7.

Nov. 27, 1951   R. H. MUELLER ET AL   2,576,631
FIRE HYDRANT VALVE OPERATOR
Filed Dec. 27, 1946   6 Sheets-Sheet 3

Inventors
ROBERT H. MUELLER
EARL E. CLINE
By Cushman, Darby & Cushman
Attorneys

Nov. 27, 1951    R. H. MUELLER ET AL    2,576,631
FIRE HYDRANT VALVE OPERATOR
Filed Dec. 27, 1946    6 Sheets-Sheet 6

Inventors
ROBERT H. MUELLER
EARL E. CLINE
By Cushman, Darby & Cushman
Attorneys

Patented Nov. 27, 1951

2,576,631

UNITED STATES PATENT OFFICE 2,576,631

FIRE HYDRANT VALVE OPERATOR

Robert H. Mueller and Earl E. Cline, Decatur, Ill., assignors to Mueller Co., Decatur, Ill., a corporation of Illinois Application December 27, 1946, Serial No. 718,752

4 Claims. (Cl. 137—13)

The present invention relates to fire hydrants generally of the type comprising a vertical barrel and shoe, with a hydrant valve positioned near the lower end of the barrel and capable of manual operation from above the barrel. Such hydrants include various arrangements of outlet nozzles adjacent the top of the barrel.

In another application, referred to hereinafter in more detail, certain novel improvements in the hydrant valve structure are presented. While such a valve structure is generally indicated in Figure 1 of this application, and referred to from time to time in the specification, it will be understood that the improvements of the present application are more specifically concerned with the top part of the hydrant, including a novel arrangement for mounting and lubricating the hydrant valve stem, as well as the nut or similar means which turns said stem. The present invention is also concerned with improved outlet nozzle constructions. The nozzles shown are substantially shock-proof, in that they develop no tendency to leak, even though the hydrant is roughly handled in use.

One of the principal objects of the invention is to provide a hydrant of the type referred to having a sealed oil or lubricant bath effective to lubricate around the upper end of the valve stem and in and around the operating nut therefor, the design being of pronounced effectiveness in maintaining adequate lubrication at the moving parts, as well as in resisting any tendency of water flowing through the hydrant barrel to displace and force the lubricating substance from its proper position around and in the moving parts referred to.

It is also an object of the invention to provide an improved packing arrangement for the valve stem and operating nut of a hydrant, consisting of packing elements of different characteristics cooperating with one another. This packing is substantially self-tightening in its action around the valve stem and its operating nut. The packing includes a resilient packing section of rubber or the like, which, while placed under compression in order that sealing energy may thereby be stored in the packing itself, is so protected by a sleeve or ferrule as to be substantially immune from tear or excessive wear by reason of contact with the moving valve stem, or parts associated therewith. The packing is so positioned and arranged in a chamber around the stem or other moving part that certain elements of the packing maintain a tight seal with the stem or the like, while other packing elements maintain a seal with the wall of the packing chamber. The construction is such that pressure entering the packing chamber tends to increase both of the sealing actions just referred to.

A very practical object of the invention is to provide a closed oil reservoir in the top of the hydrant which is in communication with all of the usual frictionally engaging moving parts to lubricate same, i. e., with the usual cooperating threads on the operating nut and valve stem and with the engaging surfaces between said nut and the structure at the top of the hydrant which supports it. In certain specific embodiments shown, the oil reservoir is closed at its bottom end by a packing around the valve stem below its threads, and at its upper end by a packing around or above the usual flange on said nut which restrains any longitudinal movement of the nut. In connection with the above and certain other objects of the invention, it will be understood that while we disclose preferred packing arrangements for these purposes, and which have inherent advantages aside from the particular combinations in which they are disclosed, other more conventional packing may be employed in the positions shown to accomplish the broad advantages referred to.

Another practical object of the invention is to provide an enclosure or housing around the valve stem and extending below the operating threads of same, which forms a closed reservoir for oil or the like, and more specifically, which forms such a reservoir in communication with or including the hollow interior of the operating nut. Ancillary to this stated purpose, it is also intended that a lubricating pressure gun or similar connection may be provided through the wall of the nut whereby lubricant may be forced under pressure into the reservoir. As a particular feature of the invention, it will be noted that the hollow oil filled operating nut has a side port therethrough to lubricate directly the moving parts where the nut is assembled in its supporting structure.

A further practical object of the invention is to provide an operating nut and lubricating assembly comprising a closed reservoir assembled on the valve stem which may be factory filled with lubricant, and shipped, stored and installed while mounted on the stem, without dissipating the lubricant. Similarly, the construction provides for removal of the stem from the hydrant with the reservoir and operating nut thereon, likewise preserving the lubricant and avoiding failure of the installation personnel to apply the necessary lubricant to the working parts. Similarly, if the hydrant is knocked over or fractured, the oil reservoir will remain intact and filled ready for convenient replacement, particularly if the valve stem is equipped with a conventional frangible coupling in anticipation of such a casualty.

It will be understood that a construction as disclosed will effectively preserve the lubricant in the reservoir, packed off at top and bottom as described, over a period of years without refilling, the particular packings and the double arrangement thereof preventing the forcing of the lubricant from its chamber, by the water which passes through the hydrant.

A further object of the invention is to provide a hydrant having a top structure with removable nozzles extending therefrom, said nozzles being capable of being replaced, yet affording a tight seal with openings from the barrel at the top thereof, when said nozzles are in position. Nozzles having various sizes of hose connecting ends and of various lengths, may be selectively attached in the same hydrant outlets, and their mounting is such as to provide for yielding movements when struck, to avoid fracture or leakage.

Various other features and advantages of the invention will be apparent as the description herein progresses.

In the drawings, which illustrate the subject matter generally referred to above, and which will be particularly described below:

Figure 1 is a vertical sectional view through a hydrant of the present invention, certain of the parts being broken away in order to show all of the main elements.

Figures 2 and 3 are horizontal sectional views taken respectively along the lines 2—2 and 3—3 of Figure 1.

Figures 4 and 5 are horizontal sectional views taken at selected points along the length of the hydrant valve operating stem, on the respective lines 4—4 and 5—5.

Figure 6 is a vertical sectional view on an enlarged scale of the top part of the hydrant, showing details of the packing and oil bath arrangement.

Figure 7 is an enlarged vertical sectional view of one portion of the packing, where it embraces the valve stem.

Figure 8 is a similar enlarged vertical sectional view of another portion of the packing which engages the valve stem operating nut.

Figure 9:
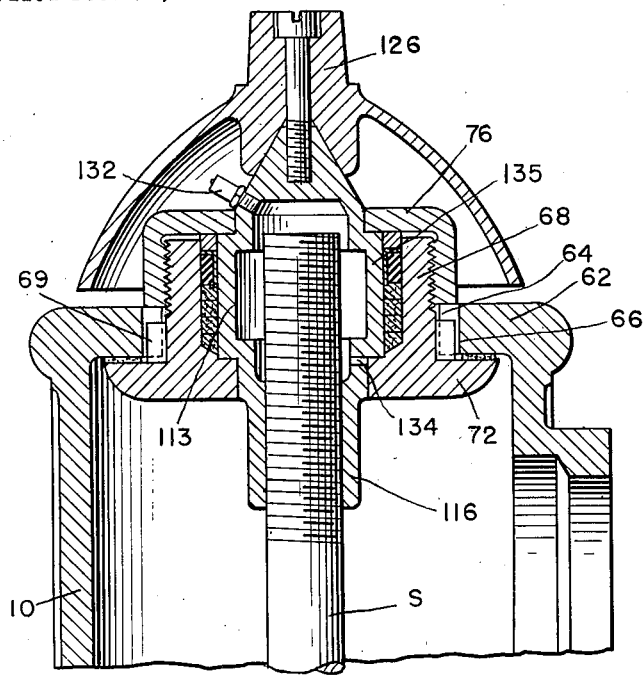
Figures 9 and 10 are respective enlarged vertical sectional views through the top of the hydrant, showing modified arrangements of the structure and packing.

In Figure 1, a substantially cylindrical hydrant barrel is shown at B, and it has a shoe E at its lower end and a bonnet or hood H at its upper end. As is well known in the art, the hydrant has a vertical valve operating stem S, which operates a valve V in order to control the discharge of water from the side outlets or nozzles O.

The barrel B is of appropriate inside diameter for insertion of the various parts mentioned and which will be hereinafter described in detail, and in the present embodiment, the barrel is formed of an upper section 10 and a lower section 12 which are detachably connected together by flanges 14 suitably connected by frangible bolts 16. Similarly, the valve stem S comprises an upper section 18 and a lower section 20 which are detachably held together by a sleeve 22 bolted around the union of said sections and having a weakened portion 24 at a point where the ends of the two sections of the valve stem are presented to and slightly spaced from one another. The flanges of the barrel sections, the spaced ends of the valve stem sections, the weakened portions of the sleeve 22 and of the bolts 16 are all in substantially horizontal alignment, as shown, so that when an object strikes the hydrant, it will break in this horizontal plane without damage to the hydrant, the parts obviously being capable of being re-assembled after any such accident has occurred, by merely replacing the sleeve and bolts.

As is described in more detail in our other application, the shoe is provided with a flat inwardly projecting flange 26 defining a circular opening to which the lower flanged end 28 of the barrel section 12 is bolted. The barrel is preferably made of cast iron, and it is provided at its open end with a circular inside recess 30 into which is tightly pressed an annular non-ferrous metal bushing 32, said bushing being interiorly threaded with straight loose threads in order to receive and secure to a correspondingly threaded lower exterior end of an annular non-ferrous valve seat ring 34 having an inside downwardly tapered valve seat 36. It will be noted that the lower edge of the seat ring engages the inside edge or lip of the flange 26 to limit the downward threading of the seat ring into the bushing 32, in order to properly position the valve seat. The seat ring 34 comprises a lower annular portion which includes the valve seat 36 and an upper portion comprising a pair of inwardly directed legs or spiders 38 terminating in a central hub 40. The space through the seat ring between the legs 38 is great enough to provide free flow of water when the valve is open, as these legs need only be large enough to contain drain passages to be referred to, and to support the central hub. There is a central vertical opening through the hub 40 which is square in cross section, in order to slidably guide the vertical movement of the valve stem, which is square in cross section as at 41 in that zone where it passes through the hub 40, i. e., from the valve member or head up to a ledge 42.

There are inwardly directed passages 44 extending through the legs 38, and these passages join with an annular groove around the exterior of the valve seat ring 34. There are a number of spaced radial openings 46 extending through the wall of the bushing 32 and through the wall of the barrel and connecting with said groove in the seat ring. These openings 46 are lined with brass ferrules. At the upper ends of the passages 44 there are resilient washers 50 of rubber or the like and interiorly lined with brass ferrules to prevent collapse. The washers 50 are engaged by a valve plate 52 slidably mounted on an elliptical portion 53 of the valve stem above the shoulder 42. The valve plate 52 has an area and is of rectangular form adapting it to overlie and cover the openings in the washers 50, and has a central opening which is the shape of the shaft portion 53 shown in Figure 5. When the main valve is closed, the square shoulder at 42 on the stem will raise the valve plate to drain the interior of the hydrant to the outside.

Above and below the annular groove located at the lower ends of the passages 44 and around the outside wall of the valve seating member 34, there may be additional annular sealing grooves provided to receive O rings. These O rings and grooves insure a tight seal between the valve seat ring and the bushing 32 above and below the ports 46.

The main valve comprises a seat washer 54, of packing or similar material, preferably laminated in nature, and held between a bottom metal washer 56 and a top metal washer 57 as shown, these parts being assembled and held in place by means of a nut 58 threaded on to the lower end of the valve stem. The top valve plate or washer 57 and the portion 41 of the valve stem may be cast of such as brass or bronze, and radial ridges 59 may be provided on the plate 57, the outside edges of which center the valve when it engages its seat, said edges being guided into the central opening 59' through the seat ring.

It has been stated that the portion 53 of the valve stem above the ledge 42 is of somewhat elliptical cross section as in Figure 5 of the drawings. The opening through the draining valve plate 52 is also of the same configuration. When the valve V is pulled upwardly onto its seat, the shoulder 42 on the valve stem passes to a position somewhat above the top surface of the resilient washers 50, and the shoulder then lifts the control plate a slight distance above the openings through the washers to the passages 44. Any water in the barrel when the valve is closed can thus drain through the passages 44 and outwardly through passages 46 to the exterior of the hydrant. However, when the valve stem is moved downwardly to open the hydrant for flow of fluid therethrough, the lower edge of a collar 60 on the valve stem engages the plate 52 and forces it downwardly against the washers 50 to compress the same, and to thus seal off the openings previously described, so that the hydrant body is closed except at its outlets when the main valve is open. The top face of the hub 40 and the lower face of valve plate 52 may be ground to provide metal to metal sealing contact when the openings are closed. The engagement of the collar 60 with the plate 52, and the engagement of the latter on the top valve face of the hub 40, when the valve stem is moved downwardly, serve to limit the degree of opening of the main valve V.

The mechanism for operating the valve stem and at the same time providing for lubricating the working parts thereof, is better shown in Figures 6 through 8. The upper barrel section 10 has a circular top inwardly directed flange 62 with defining central opening 64 and has oppositely disposed guide notches 66. Into this opening an upwardly extending cylindrical section 68 of an oil reservoir member R is inserted. There are keys 69 carried on the oil reservoir member which enter the notches 66 to properly register the member and hold it against rotation.

In general, the oil reservoir member includes means to provide one or more seals around the valve stem or its operating nut, with a chamber comprising upper and lower sections to retain a lubricant around the working parts. The oil reservoir has an outwardly extending circular flange 72 positioned beneath the flange 62 of the barrel. A nut 76 is threaded onto the extending cylindrical portion 68 of the reservoir to engage the top of the flange 62, thus holding the assembled parts in the top of the hydrant barrel.

A lower end of the reservoir R provides a suitable recess for packing for the valve stem below its operating threads, of a type more clearly illustrated in Figure 7, and as described in detail in another application specifically directed to this subject. The packing recess is defined between an interior circular collar 78 which embraces a round portion of the shaft 18 in a non-binding manner, and a gland nut 80 which is threaded into the lower end of the reservoir. The gland nut is preferably made of non-ferrous metal. Between gland 80 and collar 78, there is an annular rubber washer 90 and several annular layers of compressible packing material made of flax, as shown at 92, there being a non-ferrous metal washer 94 beneath the flax layers which has an inwardly and downwardly tapered top wall 96 whereby, when the nut 80 is tightened, the pressure exerted on the flax layers is directed inwardly toward the valve stem. It will be understood that upon compressing the flax packing, a compression will be exerted upon the rubber washer 90, and this force is stored in the packing assembly and is constantly present to resist any pressure of the fluid acting upwardly from the interior of the barrel around the valve stem. As shown in Figure 7, there may be a ferrule liner 98 of such metal as brass, lining the interior of the rubber washer 90, and the top of this ferrule may be flanged outwardly as at 100 in order to provide end support for the washer 90 and keep it from tearing when the valve stem is moved vertically through the packing. Particularly, this ferrule will prevent the rubber 90 from being squeezed upwardly into the slight space between the valve stem and the inner face of the collar 78. The rubber sleeve 90 seals the outside wall of the packing recess against leakage, while the layers of flax 92 seal the valve stem against leakage.

When such a packing is in use, any pressure from below entering the packing chamber will pass outwardly of the flax rings 92 and will exert an inward pressure thereon which will tighten the seal against the stem. Similarly, this pressure acting upwardly on the rubber ring will have the effect of tightening its seal against the outer wall of the packing chamber. The soft rubber ring places an even resilient thrust on the flax, thus automatically taking up wear. The rubber rings keeps the packing tight by applying force in an axial direction, and this force acts in the flax inwardly toward the valve stem, particularly adjacent to the shoulder 96.

Turning again to Figure 6, the upper extension 68 of the reservoir is provided with an inside annular bore 103 having a bottom tapered surface 104, and in this bore there are several circular layers of flax 106 in ring-like form and a circular rubber washer 108 as more clearly shown in Figure 8. Mounted on the annular ledge 110 upon the interior of the reservoir body below the taper 104, there is a valve stem operating nut 112, the outer wall of said nut being sealed by the packing means 106 and 108. The operating nut has an outwardly extending flange 113 limited by upper and lower shoulders 114 and 115 which respectively engage the nut 76 and the shoulder 118 to retain said nut against longitudinal movement while it is being turned to open and close the main valve. The interior of said nut is hollow, and it has a lower cylindrical threaded tube 116 which engages the conventional threads on the upper end 18 of the valve stem, so that upon turning said nut, the valve stem is caused to rise and fall in order to close and open the main valve V of the hydrant. There is a non-ferrous metal ring 118 in the upper end of the packing recess, and it bears against the rubber washer 108 (Figure 8). This ring is pressed against the packing by tightening the securing nut 76, the top flange 120 of the latter serving to retain the operating nut and packing in position as shown. The head of the operating nut comprises a dome-like structure 122 square or otherwise polygonal in cross section and this portion fits within a socket 124 (likewise square in section) of the operating head or nut 126, the latter including the usual wrench portions and a skirt 128 which protects the whole assembly from the weather. The wrench head 126 may be bolted to the top of the operating nut 122 as by a bolt 130. There may be an Alemite fitting or similar device 132 fitted in the wall of the operating nut, in order to pump lubricant into the interior of the reservoir to lubricate all of the parts thereof, including the screw threads of the operating stem. Such a device would include a one-way valve to retain the lubricant in the reservoir. The ledge 110 between the reservoir member and the operating nut may likewise be lubricated by one or more radially extending passages 134 from the interior of the operating nut to the surface 110 which supports the flange of the reservoir member.

From the above, it will be apparent that I have provided an assembly in which a reservoir of oil or other lubricant is constantly retained around the upper operating end of a valve stem. The arrangement provides not only for lubrication of the valve stem where it passes into the reservoir member, but also where the operating nut turns within said member. Both of these packings are of compression storing type, and pressure exerted upwardly on the packing from the hydrant only serves to tighten the seal of the packing.

It will be understood that both of the packings described will operate in substantially the same manner. That is, upwardly exerted fluid pressure from the hydrant will act from around the outside of the flax packing to further tighten same against the valve stem, while the rubber packing will maintain a seal against the outer wall of the packing chamber. The compressed rubber will in itself tend to maintain the seal exerted by the flax rings against the stem. By reason of the double packing arrangement provided, at opposite ends of the reservoir, the hydrant pressure cannot displace the oil from the reservoir even if it should penetrate the lower seal, because of the presence of the upper seal, as described.

It will be apparent that the reservoir, operating nut and packings may be assembled at the factory on the operating stem, and the oil bath filled. With the cap 76 threaded down on the extension 68, both packings will be tight and the assembly may be shipped, stored and installed, without loss of lubricant. In assembly, it is merely necessary to thread the valve seat ring 34 into the bushing 32 in the lower section of the hydrant, using a wrench on the square portion of the valve stem. The cap nut 76 may be temporarily removed after which the top section of the hydrant is placed over the valve stem and the cap nut is then threaded on to firmly attach the reservoir assembly in the top of the hydrant. Obviously, the Alemite fitting 132 can be temporarily removed and then threaded in place after the above operations.

In the event that it is necessary to remove the main valve or its stem, due to damage as previously mentioned, the cap nut 76 can be removed, after which the hydrant top section may be removed for repair to any of the parts within the same. As previously suggested, a wrench applied to the square section of the valve stem will serve to remove the main valve seat ring by reason of the square section 41 of said stem which passes through a square opening in the hub of said seat ring.

Thus, the main valve, valve stem, reservoir and operating nut constitute a structure capable of being shipped, installed, removed and replaced as a unit.

In the somewhat simplified embodiment of Figure 9, the lower portion of the reservoir which provides a chamber around and below the screw threads on the valve stem, is omitted, leaving the interiorly threaded sleeve 116 of the operating nut 135 exposed. The packing as previously described is arranged around the operating nut in the manner referred to. In this embodiment, the Alemite fitting for filling the reservoir may not be required, although one is shown in the drawings.

Figure 10:
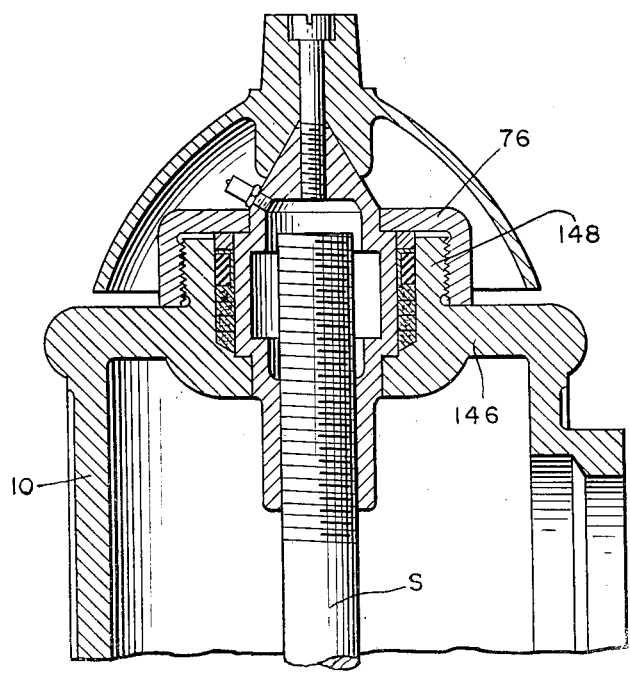

In the embodiment of Figure 10, the reservoir and support for the packing around the operating nut are substantially formed by the configuration of the top of the barrel 10, said barrel having a flange 146 which is itself formed with the central upstanding cylindrical portion 148 to provide a packing chamber of the type referred to around the operating nut. The ledge for supporting the flange of the operating nut is formed in the top flange 146. As in the preceding embodiment, the outside portion of the oil chamber is substantially dispensed with, but the structure is of such design as to provide the proper packing arrangement around the valve operating nut, and may include a bolt such as 134.

Figure 11:
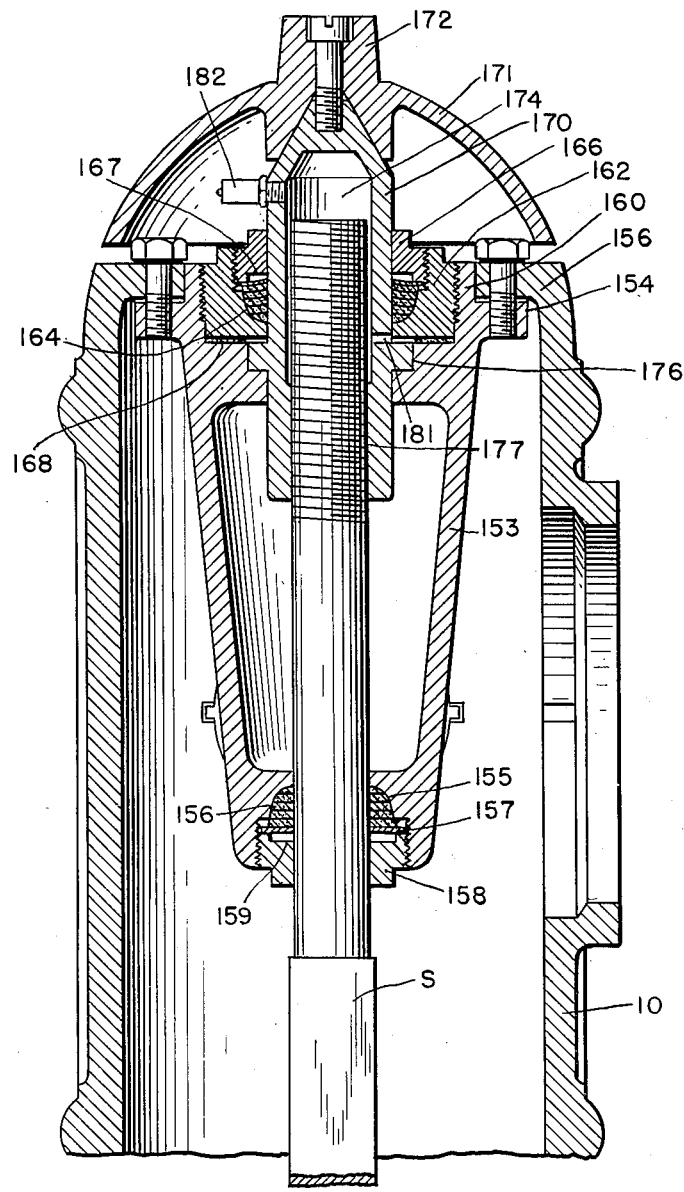
Figure 11 is a vertical sectional view similar to Figure 6 of another modification of the invention.
Figure 12:
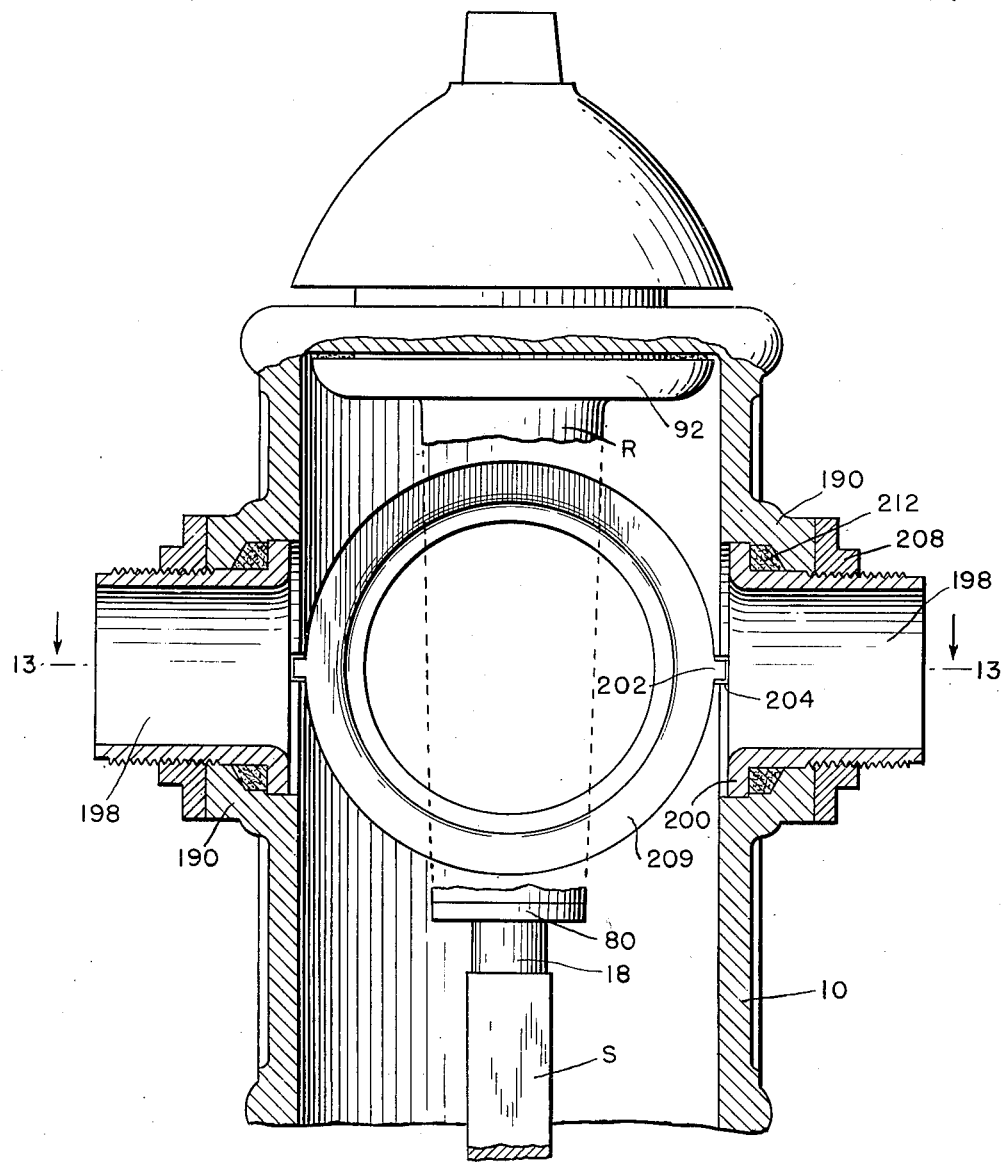
Figure 12 is a vertical sectional view of the top of the hydrant, but taken in a plane to illustrate the nozzle outlets.

In Figure 11, the oil reservoir 153 is of somewhat modified conical form, having a top circular flange 154 positioned against and beneath an inwardly extending circular flange 156 on the top of the barrel 10. At the bottom of the reservoir, there is an upwardly and inwardly tapered annular packing recess 155 into which laminated discs of rubber and packing initially square in cross section may be inserted, this packing being compressed into the recess 155 by a flexible metal ring 157 which is forced upwardly into the recess against the packing by the follower nut 158, the latter being threaded into the end of the reservoir. The above arrangement of the packing is described in more detail in Patent No. 2,537,230, January 9, 1951, to Robert H. Mueller entitled "Packing Assembly."

The washer 157 is of the spring metal type, and as shown in Figure 11, while it is gripped between the nut 158 and a shoulder around the bottom opening in the reservoir 155, by reason of the well or depression 159 on the inner face of the nut 158, the washer 157 may spring outwardly adjacent its center, thus providing a constant pressure exerted on the packing 156. The edge area of the washer 157 is shown out of contact with the shoulder around the opening in the recess, it being understood that in practice the nut 158 is not threaded inwardly to an extent sufficient to actually bring the edge area of the washer into contact with the shoulder. A slight space may be left between these parts in order to permit subsequent adjustment of the packing to tighten same, by inward adjustment of the nut 158. As described in the said co-pending application, the amount of packing placed in the recess is of volume substantially greater than the recess whereby the packing tends to protrude, even when compressed, beyond the open face of the recess. This protruding packing has the effect of distorting the washer 157 from its true form, yet to a condition within the elastic limits of the material of the washer, whereby a pressure is constantly maintained on the packing.

It will be understood that the above described form of the invention has most of the advantages previously mentioned, although the specific type of packing employed in making the reservoir seal is somewhat different. It will be particularly noted that the reservoir assembly, including the operating nut and associated parts, may be shipped and stored while mounted on the valve stem.

The oil reservoir 153 is bolted to the inwardly extending annular flange 156, as shown, and it has an upwardly extending circular portion 160, the latter being interiorly threaded to receive the threaded outside surface of a packing housing 162. This packing housing has a downwardly and inwardly tapering packing bowl 164, which receives packing of the type previously described, and as fully described in Patent No. 2,537,230 to Mueller referred to. As has been disclosed, the packing in the bowl 164 is compressed by a nut 166, which is threaded into the packing housing 162. There is a central depression 167 in the packing nut, to permit the expansion of the spring washer as previously mentioned. If desired, there may be any suitable packing means, such as a washer, provided between the interior end of the nut 162 and the shoulder 168 on the top of the reservoir.

The valve stem operating nut 170 is connected at its top, in a manner previously referred to, to a hood or water cap having a skirt 171. The interior of the operating nut is hollow, providing an oil or lubricant reservoir 174. The operating nut is held against inward and outward movement in the central top opening in the reservoir member, by its outwardly extending circular flange 176. It will be understood that this flange prevents outward and inward movement of the nut, but the rotary movement thereof is permitted so that the cooperating inner threads 177 on the nut, and those on the valve stem "S" will cause the valve to be moved from and toward its seat. As in the preferred embodiment, previously mentioned, there may be an opening 181 extending through the wall of the nut above its flange 176, to provide for lubrication of the outer moving parts where the nut turns between the reservoir and the packing housing 162. As in the embodiment previously described, there is an Alemite fitting 182 in order that the reservoir may be filled with oil, grease or other lubricants.

As in the preferred embodiment of the invention, the arrangement is such that the reservoir may be filled with lubricant, such as grease or the like, through the fitting 182, in fact, the interior of the reservoir both above and below the threads 177 may be filled to an extent that pressure exists in the chamber. There will be no leakage of the lubricant from the reservoir during transportation, installation or use. During use, both upper and lower packing arrangements provided will resist any tendency of the water pressure within the hydrant to force the oil or other lubricant from the reservoir. As disclosed, the packing is self regulating in the pressure it applies to the valve stem and adjacent parts. An increase in the pressure of fluid attempting to escape will cause an increase in the pressure exerted by the packing on the working parts.

Figure 13:
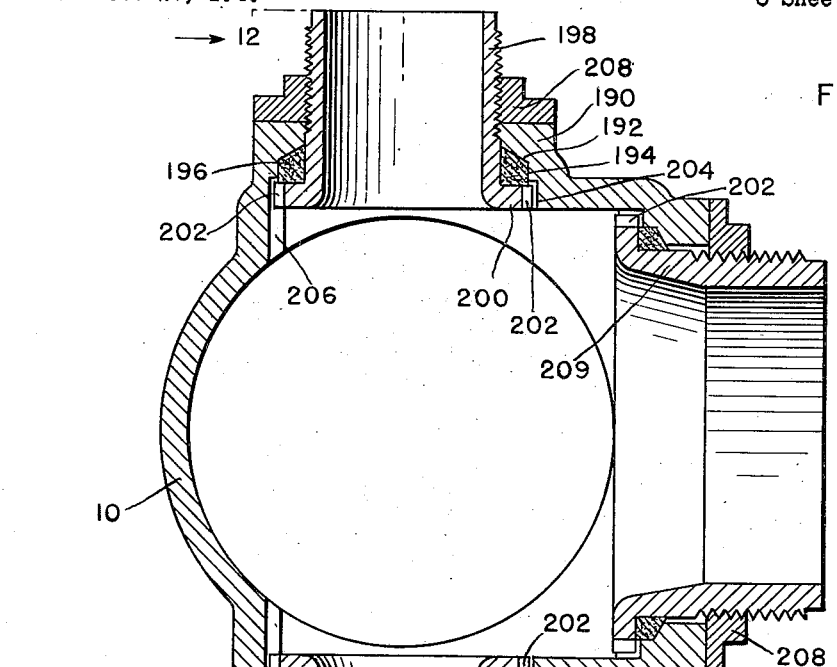
Figure 13 is a horizontal sectional view through the hydrant taken generally along the line 13—13, of Figure 12.
Figure 14:
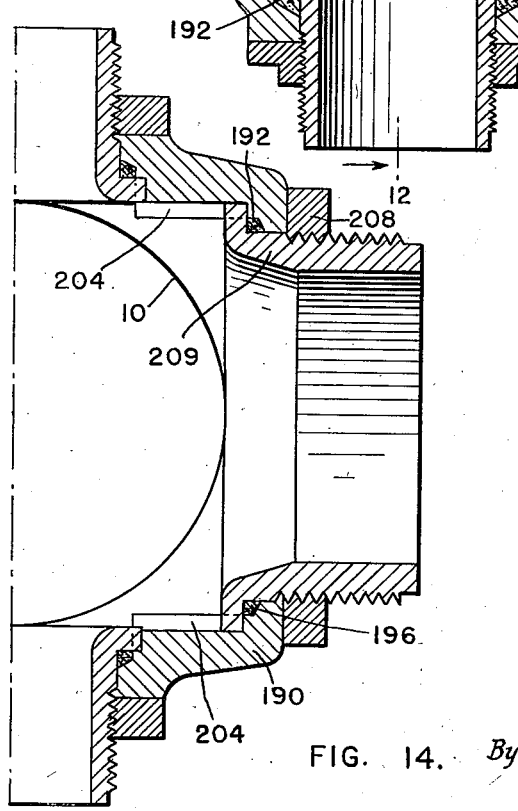
Figures 14 and 15 are central horizontal sectional views through slightly different forms of nozzle outlet structures.

In Figures 12-15, novel specific constructions of the outlet nozzles are shown. In each instance, the upper portion of the body of the hydrant is provided with annular extensions 190. As shown in Figure 13, the base of this extension is cut away, providing a circular slanting wall 192 and a straight inwardly extending wall 194, and in the circular chamber bounded by these walls, there is a compressible circular gasket 196. The nozzle member 198 may be of any length, and the size of its hose connecting opening may be varied, depending on the needs of local communities. The construction disclosed provides for the removal of and replacement of this nozzle section. The inner end of each nozzle extension is bent outwardly through substantially 90° to form a flange 200, and there are any number of radially extending spaced lugs 202 on said flange which are adapted to register with corresponding cutouts in the body of the hydrant around the wall of its opening.

On one side of the nozzle, as viewed in Figure 13, these cut-outs may take the form of relatively long slots 206. The lugs 202 prevent any turning of the nozzle in the side opening from the hydrant casing when hose is being attached or detached. The exterior of the nozzle is threaded as shown whereby a locking nut 208 may be employed to securely lock the nozzle within the extension 190 of the body, and thus compressing the packing 196 to effect a satisfactory seal, it being obvious that the slanting surfaces 192 around the outlet openings will assist for this purpose.

Figure 15:
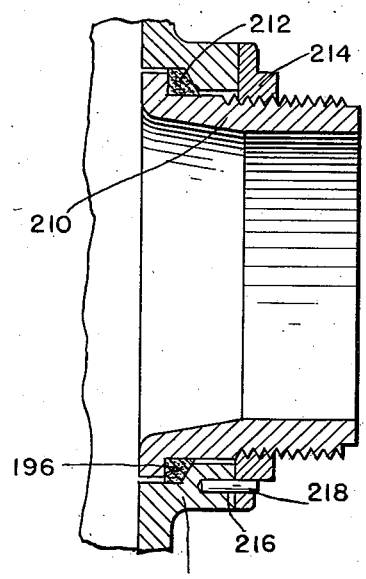

The construction just described is particularly adequate for the smaller nozzles from the hydrant. The steamer nozzle 209 shown at the right in Figure 13 or in Figure 14 may be similarly removably attached. However, in the case of any of the nozzles, if it is not desired to employ the lugs such as at 202 and the slots in the hydrant body such as 204, the nozzle 210 as shown in Figure 15 may be securely locked in a desired position compressing the packing as previously described, simply by means of a nut 214 threaded onto the outside of the nozzle. When the nut 214 has been tightened to a desired extent, a hole 216 may be drilled inwardly through the flange of the nut and into the metal of the outwardly extending portion of the body, after which a pin 218 may be driven inwardly through the nut and into the body to securely lock the parts in place.

It will be obvious that various changes may be made in the parts disclosed herein while still remaining within the scope of the invention. For instance, where square portions of the valve stem are mentioned, other polygonal forms would serve. Other shapes of that portion of the stem 53 shown in Figure 5 may be employed, so long as the valve plate 52 is provided with an opening of similar form to keep it from turning on the stem. Likewise, the reservoir assembly may be used in hydrants not having the breakable body feature disclosed herein. As mentioned, the double seal feature described for the reservoir may be carried out with packing of more conventional type, although the packings shown are preferred. In the various forms shown, the packing glands and similar metal parts which contact the steel valve stem may preferably be made of brass. Any type of lubricating oil may be employed, but relatively heavy oil or soft grease is preferred.

In connection with the preferred form of packing, modifications are shown wherein the lower packing assembly is omitted. It will be understood that in the form shown in Figure 11, the lower packing assembly may likewise be omitted, although the double arrangement of packing is preferred and provides outstanding advantages.

While we have disclosed the packing used for such as the rings 92 as being of flax, it will be understood that other suitable compressible material could be used.

We claim:

1. In a hydrant having a body and a main valve: a valve stem extending outwardly from said valve and having operating threads adjacent its outer end; a hollow nut having an interiorly threaded inner end engaging the threaded portion of said stem, having a closed outer end defining an interior lubricant chamber about the outer end of said stem, and having an exterior annular flange; a bearing for said nut to turn therein and adapted to be sealingly secured to the hydrant body, said bearing including inner and outer thrust bearing surfaces engaged with the corresponding inner and outer surfaces of said flange on said nut; a packing assembly disposed outwardly of said inner thrust bearing surface and forming a seal between said nut and bearing; and said nut having a port through its wall adjacent a lower portion of said chamber and opening to a contacting surface of said bearing inwardly of said packing assembly.

2. In a hydrant having a body and a main valve: a valve stem extending outwardly from said valve and having operating threads adjacent its outer end; a hollow nut having an interiorly threaded inner end engaging the threaded portion of said stem, having a closed outer end defining an interior lubricant chamber about the outer end of said stem, and having an exterior annular flange; a bearing for said nut to turn therein and adapted to be sealingly secured to the hydrant body, said bearing including inner and outer thrust bearing surfaces engaged with the corresponding inner and outer surfaces of said flange on said nut; a packing assembly disposed between the circumferential surface of said flange on said nut and said bearing and forming a seal therebetween; and said nut having a port through its wall adjacent a lower portion of said chamber and opening to a contacting surface of said bearing inwardly of said packing assembly.

3. In a hydrant having a body and a main valve: a valve stem extending outwardly from said valve and having operating threads adjacent its outer end; a hollow nut having an interiorly threaded inner end engaging the threaded portion of said stem, having a closed outer end defining an interior lubricant chamber about the outer end of said stem, and having an exterior annular flange; a lubricant reservoir assembly mounted on said stem and adapted to be sealingly secured to the hydrant body, said reservoir assembly having an interior chamber about said stem inwardly of said nut and including a bearing for said nut to turn therein provided with inner and outer thrust bearing surfaces engaged with the corresponding inner and outer surfaces of said flange on said nut; said reservoir assembly further including an inner packing assembly forming a seal about said stem inwardly of said threads and an outer packing assembly disposed outwardly of said inner thrust bearing surface and forming a seal about said nut; and said nut having a port through its wall adjacent a lower portion of said chamber therewithin and opening to a contacting surface of said bearing inwardly of said outer packing assembly.

4. In a hydrant having a body and a main valve: a valve stem extending outwardly from said valve and having operating threads adjacent its outer end; a hollow nut having an interiorly threaded inner end engaging the threaded portion of said stem, having a closed outer end defining an interior lubricant chamber about the outer end of said stem, and having an exterior annular flange; a lubricant reservoir assembly mounted on said stem and adapted to be sealingly secured to the hydrant body, said reservoir assembly having an interior chamber about said stem inwardly of said nut and including a bearing for said nut to turn therein provided with inner and outer thrust bearing surfaces engaged with the corresponding inner and outer surfaces of said flange on said nut; said reservoir assembly further including an inner packing assembly forming a seal about said stem inwardly of said threads and an outer packing assembly forming a seal about the circumferential surface of said flange on said nut; and said nut having a port through its wall adjacent a lower portion of said chamber therewithin and opening to a contacting surface of said bearing inwardly of said outer packing assembly.

ROBERT H. MUELLER.
EARL E. CLINE.

REFERENCES CITED

The following references are of record in the file of this patent:

UNITED STATES PATENTS

| Number | Name | Date |
|---|---|---|
| 472,045 | Goss | Apr. 5, 1892 |
| 820,940 | Stoddard | May 15, 1906 |
| 911,891 | Lyon | Feb. 9, 1909 |
| 931,128 | Keith | Aug. 17, 1909 |
| 978,385 | Lofton | Dec. 13, 1910 |
| 1,072,208 | Dahl | Sept. 2, 1913 |
| 1,083,307 | Thorne | Jan. 6, 1914 |
| 1,091,210 | Gauntt | Mar. 24, 1914 |
| 1,200,961 | Mabe | Oct. 10, 1916 |
| 1,513,516 | McCabe | Oct. 28, 1924 |
| 1,535,912 | Flower | Apr. 28, 1925 |
| 1,717,392 | Lofton | June 18, 1929 |
| 2,018,454 | Lofton | Oct. 22, 1935 |
| 2,019,919 | Lofton | Nov. 5, 1935 |
| 2,032,881 | Lofton | Mar. 3, 1936 |
| 2,078,782 | Storey | Apr. 27, 1937 |
| 2,088,426 | Lofton | July 27, 1937 |
| 2,100,862 | Lofton | Nov. 30, 1937 |
| 2,417,799 | Seaver | Mar. 18, 1947 |

FOREIGN PATENTS

| Number | Country | Date |
|---|---|---|
| 236,053 | Great Britain | of 1925 |
| 374,873 | Great Britain | of 1932 |